US008685482B2

(12) United States Patent
Stratakis

(10) Patent No.: US 8,685,482 B2
(45) Date of Patent: Apr. 1, 2014

(54) GLUTEN-FREE FOOD COMPOSITIONS COMPRISING CHEESE, STARCH, AND GLUTEN-FREE FLOUR AND METHODS FOR MAKING THE SAME

(75) Inventor: Dimitrios Stratakis, Thessaloniki (GR)

(73) Assignee: U&S Unismack S.A., Stavrohori (GR)

( * ) Notice: Subject to any disclaimer, the term of this patent is extended or adjusted under 35 U.S.C. 154(b) by 673 days.

(21) Appl. No.: 12/823,989

(22) Filed: Jun. 25, 2010

(65) Prior Publication Data

US 2011/0027421 A1 Feb. 3, 2011

(30) Foreign Application Priority Data

Jul. 29, 2009 (GR) ............................... 20090100429

(51) Int. Cl.
*A21D 13/00* (2006.01)
(52) U.S. Cl.
USPC ............ 426/550; 426/549; 426/580; 426/582
(58) Field of Classification Search
USPC .................................. 426/550, 549, 580, 582
See application file for complete search history.

(56) References Cited

U.S. PATENT DOCUMENTS

| 5,095,008 | A | 3/1992 | Pflaumer et al. |
| 5,344,663 | A | 9/1994 | Jewell et al. |
| 5,789,012 | A | 8/1998 | Slimak |
| 5,827,974 | A | 10/1998 | Nussinovitch et al. |
| 5,939,127 | A | 8/1999 | Abboud |
| 6,322,841 | B1 | 11/2001 | Jackson et al. |
| 6,451,367 | B1 | 9/2002 | McNaught et al. |
| 6,479,090 | B1 | 11/2002 | Carey et al. |
| 6,541,060 | B2 | 4/2003 | Jeffcoat et al. |
| 7,371,421 | B2 | 5/2008 | Domingues et al. |
| 7,595,081 | B1 | 9/2009 | Bellar |
| 2005/0106303 | A1 | 5/2005 | Huang et al. |
| 2006/0083842 | A1 | 4/2006 | Miller |
| 2006/0222740 | A1 | 10/2006 | Kao et al. |
| 2007/0092620 | A1 | 4/2007 | Zimeri et al. |
| 2007/0116846 | A1 | 5/2007 | Singh-Meneghini |
| 2007/0160728 | A1 | 7/2007 | Rudie et al. |
| 2009/0017170 | A1 | 1/2009 | Armstrong et al. |
| 2009/0098270 | A1 | 4/2009 | Engleson et al. |
| 2009/0220654 | A1 | 9/2009 | Kino et al. |
| 2010/0015279 | A1 | 1/2010 | Zhang et al. |
| 2010/0055284 | A1* | 3/2010 | Karwowski et al. .......... 426/560 |
| 2011/0117246 | A1* | 5/2011 | Clement .......................... 426/62 |

FOREIGN PATENT DOCUMENTS

| EP | 2042042 | 5/2009 |
| EP | 2100511 | 9/2009 |
| WO | WO 00/27210 | 5/2000 |
| WO | WO 01/19195 | 3/2001 |
| WO | WO 2005/046334 | 5/2005 |

OTHER PUBLICATIONS

Fasano, et al. 2003. "Prevalence of Celiac Disease in At-Risk and Not-At-Risk Groups in the United States." *Arch Intern Med.* 163:286-292.
Mäki, et al. 2003. "Prevalence of Celiac Disease among Children in Finland." *The New England Journal of Medicine* 348(25):2517-2524.
Reif and Lerner. 2004. "Tissue transglutaminase—the Key Player in Celiac Disease: a Review." *Autoimmunity Reviews.* 3(1):40-45.
Saklar, et al. 1999. "Instrumental Crispiness and Crunchiness of Roasted Hazelnuts and Correlations with Sensory Assessment." *Journal of Food Science* 64(6):1015-1019.
Saunderlin, George. 1994. "Celiac Disease: a Review." *Gastroenterology Nursing* 17(3). 100-105.
Sollid, et al. 1989. "Evidence for a Primary Association of Celiac Disease to a Particular HLA-DQ $\alpha/\beta$ Heterodimer." *J. Exp. Med.* 169:345-350.

* cited by examiner

*Primary Examiner* — Lien T Tran
(74) *Attorney, Agent, or Firm* — Davis Wright Tremaine LLP

(57) ABSTRACT

Disclosed herein is a composition for making a gluten-free food product, wherein the composition can include, as its main ingredients, one or more types of cheese, one or more types of starch, and one or more types of gluten-free flour, wherein the one or more types of cheese includes 20% to 40% by weight of the composition, the one or more types of starch includes 20% to 40% by weight percent of the composition, and the one or more types of gluten-free flour includes 1% to 10% by weight of the composition. The composition can further include other ingredients for flavor, structure, texture, and the like. In some embodiments, the gluten-free food product can be, for example, a cracker, a cookie, a cake, a chip, a bread-stick, and the like. Some embodiments of the invention provide methods for making gluten-free food products.

1 Claim, No Drawings

GLUTEN-FREE FOOD COMPOSITIONS COMPRISING CHEESE, STARCH, AND GLUTEN-FREE FLOUR AND METHODS FOR MAKING THE SAME

CROSS-REFERENCE TO RELATED APPLICATIONS

This application claims priority from Greek Patent Application No: 20090100429, filed on Jul. 29, 2009 and entitled "GLUTEN FREE CRACKER BASED ON CHEESE AND STARCH (MAINLY FROM POTATO) AND ITS PRODUCTION PROCESS," which is incorporated herein by reference in its entirety.

FIELD

The invention disclosed herein generally relates to methods and compositions for making gluten-free food products. In particular, the invention disclosed herein generally relates to gluten-free baked goods, such as gluten-free crackers.

BACKGROUND

Gluten intolerance is an organism's inability to tolerate gluten, a protein found in wheat, barley, oats and rye. In humans, the intolerance manifests in various forms in different individuals, including celiac disease, non-celiac gluten intolerance, dermatitis herpetiformis, migraines, and wheat allergy. This type of disorder is often genetically inherited; and because the lesion is caused by the immune system, it is considered an autoimmune disorder.

The production of anti-gliadin antibodies by an intolerant individual after the consumption of food containing gluten flattens out or damages the villi of the small intestine, responsible for the absorption of nutrients, vitamins and trace elements. The result is that food particles leak into the bloodstream, and the body's natural defense system sees these particles as "foreign invaders." The problem becomes twofold: the body cannot absorb important nutrients and the body seems to attack itself at the same time.

Symptoms of gluten intolerance range widely, but as time passes, researchers are finding more and more links to gluten intolerance and chronic illnesses. In sum, symptoms may include one or more of the following, plus symptoms not listed: leaky gut, celiac disease; skin problems (chronic rashes, itching, sores, inflammation); allergic reactions of many sorts; bowel problems, including cramping; bloating; mouth sores (mouth ulcers); eczema; low immunity to disease; neurological dysfunction; and headaches.

Gluten intolerance is connected to gastro-intestinal disorders and the consequences are considerable for human development and health maintenance. Celiac disease is a type of more commonly manifested form of gluten intolerance. The symptoms and manifestations of celiac disease differ, very often, from case to case and depending on age of the affected individuals. Infants present gastrointestinal discomfort, diarrhea, often, bulky and particularly fetid defecation and immobility or loss of weight. Children, besides the symptoms described above, may present nausea, vomiting, anorexia, anemia, dermatitis and mouth aphtha. They may present irritability as well. Adults, at the initial stage of the disease present a general feeling of sickness and fatigue, even when gastrointestinal disturbances are limited. Further, because of the limited absorption of vitamins, trace elements and nutrients, anemia, osteopenia, as well as neural and hormonal disorders are noted. Details about celiac disease can be found Fasano et al., 2003, "Prevalence of Celiac Disease in At-Risk and Not-At-Risk Groups in the United States: A Large Multicenter Study," *Arch Intern Med.* 163:286-292; Mäki et al., 2003, "Prevalence of Celiac Disease among Children in Finland," *The New England Journal of Medicine,* 348:2517-2524; Sollid et al., 1989, "Evidence for a primary association of celiac disease to a particular HLA-DQ alpha/beta heterodimer," *The Journal of Experimental Medicine,* 169(1): 345; Suanderline 1994, "Celiac Disease: a Review," *Gastroenterology Nursing* 17(3), 100-105; and Reifa and Lerner, 2004, "Tissue transglutaminase—the Key Player in Celiac Disease: a Review," *Autoimmunity Reviews,* 3(1):40-45; each of which is hereby incorporated by reference in its entirety.

Although gluten intolerance-related diseases, such as celiac disease, are serious and often chronic diseases, they can be treated quite effectively, without medication or medical intervention. It is recommended amongst other things in the treatment of celiac disease, non-celiac gluten intolerance, dermatitis herpetiformis, migraines, and wheat allergy.

The treatment is a strict life-long gluten-free diet, which results in the restoration of the small intestine wall in a normal condition and the control of the disease. Special attention should be given even to least gluten quantities because the degree of the lesion caused to the small intestine and the time of restoration are disproportional.

SUMMARY

The invention described herein provides gluten-free food compositions that can be used to produce healthy food alternatives for the gluten intolerant population. The invention described herein also provides methods and systems for creating such gluten-free food compositions. In particular, one of the objectives of this invention is to promote a cracker with excellent taste and able to be consumed even by people suffering from celiac disease, combining pioneer cheese types with fat content 36%-48% and starch, mainly from potato, thus offering a tasty, nutritional and safe product.

In some embodiments, the food composition is obtained by blending with cheese additional materials in the form of powder or particles: potato starch, yeast extract, salt, cheese aroma, rice flour, corn flour, corn starch, modified corn starch, potato vegetable fibers, sugar, disphosphoric acid disodium salt, ammonia, soda and mono-diglycerides. In some embodiments, flakes, granular, cubes, or chunks of one or more ingredients are used to make the composition.

In some embodiments, water is added to create a dough-like composition for making food product. In some embodiments, water is added prior to the mixing of the ingredients. In some embodiments, water is added after the ingredients are already mixed. In some embodiments, water is added while the ingredients are being mixed.

Embodiments of the invention include a composition for making a gluten-free food product, wherein the composition can include, as its main ingredients, one or more types of cheese, one or more types of starch, and one or more types of gluten-free flour, wherein the one or more types of cheese includes 20% to 40% by weight of the composition, the one or more types of starch includes 20% to 40% by weight percent of the composition, and the one or more types of gluten-free flour includes 1% to 10% by weight of the composition. The composition can further include: one or more ingredients such as, for example, of salt, mono-diglycerides of fatty acids, yeast extract, edam aroma, cream, diphosphoric disodium, ammonia, dicarboxylic sodium, xanthane, potato vegetable fibers, sugar, water, and the like.

In some embodiments, the one or more types of cheese can be, for example, Cheddar, blue, leaf-wrapped, soft, hard, semi-soft, washed rind, semi-firm, firm, mountain cheese, Mozzarella, Provolone, Edam, Feta, Gouda, Parmesan, Colby, Taleggio, Affidelice, Epoisses, Manchester, Dorset, Livarot/Artisanal, Pont l'Evêque, Abbaye de Tamie, Sentinelle, Schaf Reblochon, Fromage de Meaux, Brie de Nangis, Forsterkase, Monte Enebro, Banon de Chalais, Nettle Meadow Kunik, Flada, Coulommiers, Old Kentucky Tomme, Chabichou du Poitou, Torta del Casar, Saint Marcellin, Ossau Iraty, Fleur du Maquis, Flixer, Fontina Val d'Aosta, Garrotxa, Ibores, Beermat/Aarauer Bierdeckel, Morbier, Majorero, Pimenton, Bianco Sardo di Moliterno, Cravero Parmigiano Reggiano, Piave, Sbrinz, Pecorino Toscano Stagionato, Pecorino Sardo, Pecorino delle Balze Volteranne, Roomano, and the like, as well as any combination thereof. Likewise, the one or more types of starch can include, for example, starch from one or more of rice, wheat, maize (corn—such as cornstarch and/or modified cornstarch), potato (such as potato starch and/or modified potato starch), cassava, arrowroot, arracacha, buckwheat, barley, oat, millet, rye, banana, breadfruit, canna, colacasia, katakuri, kudzu, malanga, oca, polynesian arrowroot, sago, sorghum, sweet potato, taro, water chestnut, yams, chestnuts, edible beans, fava beans, lentils, mung bean, peas, and the like, as well as any combination thereof.

In some embodiments, the one or more types of gluten-free flour can include, for example, amaranth flour, bean flour, buckwheat flour, cassava flour, chestnut flour, chickpea flour, Chuño flour, corn flour, nut flour, seed flour, cornmeal, peasemeal or pea flour, Maida flour, Cassava flour, peanut flour, rice flour, potato flour, rye flour, tapioca flour, teff flour, and the like. The nut flour can derived, for example, from almonds, pecans, walnuts, Brazil nut, candle nut, cashew nut, Gevuina nut, chestnut, pine nut, Macadamia nut, Mongongo nut, peanut, pistachio nut, hazelnuts, hickories, and the like. The seed flour can be derived from source selected from the group consisting of *Acacia aneura* (mulga), *Acacia cowleana, Acacia estrophiolata* (ironweed), *Acacia ligulata* (umbrella bush), *Acacia murrayana* (tjuntjula), *Acacia tetragonophylla* (wakalpulka), *Acacia kempeana* (Witchetty bush), *Acacia coriacea* (Wiry wattle), *Panicum* spp. (eg *Panicum australiense, Panicum decompositum, Panicum effusum*), *Astrelba pectinata* (Mitchell grass), *Portulaca oleracea, Portulaca intraterranea, Oryza sativa, Marsilea drummondii* (Nardoo), *Atriplex nummularia* (Old man saltbush), *Acacia notabilis, Acacia pyrifolia, Acacia tetragonophylla, Acacia victoriae, Acacia sophorae, Acacia stenophylla, Acacia tumida, Aleurites moluccana, Amaranthus mitchellii, Amaranthus grandiflorus, Brachiaria piligera, Brachiaria milliformis, Brachychiton diversifolium, Brachychiton gregorii, Brachychiton paradoxum, Brachychiton populneum, Bruguiera rheedii, Calandrinia balonensis, Canarium australianum, Canavalia maritima, Entada phaseolides, Eragrostris eriopoda*(Wangunu), *Eucalyptus leptopoda, Eucalyptus microtheca, Nymphae gigantea, Rhyncharrhena linearis*, and *Themeda australis.*

In some embodiments, the composition can further include one or more additives, wherein the one or more additives modifies a flavor such as, for example, sweetness, saltiness, bitterness, sourness, spiciness, eggs or egg flavor, a cheese flavor, a fruit flavor, a nut flavor, a vegetable flavor, a meat flavor, and the like, as well as any combination thereof. The one or more additives can be, for example, salt, Mono-diglycerides of fatty acids, natural or artificial flavorings, cream, glucono delta lactone, Ammonium Carbonate, modified potato starch, potato vegetable fibers, yeast extract, flavoring, sugar, and the like, as well as any combination thereof. The one or more additives can include, for example, olive paste/pieces/bits, sun-dried tomato paste/pieces/bits, onion, paste/pieces/bits, green onion paste/pieces/bits, chive paste/pieces/bits, pesto paste/pieces/bits, and the like, as well as any combination thereof. The composition can further include one or more modifying agents, wherein the one or more modifying agents modifies the structure or texture of the gluten-free food product made from the composition. The one or more modifying agents can include, for example, salt, mono-diglycerides of fatty acids, yeast extract, natural flavorings, artificial flavorings, cream, glucono delta lactone, Ammonium Carbonate, Sodium Bicarbonate, Xanthane, modified Potato starch, potato vegetable fibers, sugar, water, and the like, as well as any combination thereof. The natural flavorings can include, for example, pesto paste, sun-dried tomato paste, olive paste, Feta, Oregano, Cheddar, Parmesan, garlic, basil, olive oil, and the like, as well as any combination thereof.

In some embodiments, the gluten-free food product can be, for example, a cracker, a cookie, a cake, a chip, a bread-stick, and the like. Some embodiments of the invention provide a method for making a gluten-free food product, including: mixing a plurality of ingredients, wherein the plurality of ingredients can include, for example, one or more types of cheese, one or more types of starch, one or more types of gluten-free flour, and one or more additives, wherein the one or more types of cheese can include, for example, 20% to 40% by weight of the plurality of ingredients, the one or more types of starch can include, for example, 20% to 40% by weight percent of the plurality of ingredients, and the one or more types of gluten-free flour can include, for example, 1% to 10% by weight of the plurality of ingredients; and wherein, according to the methods, a gluten-free food product can be obtained therefrom. The one or more additives can be any of those listed above, such as, for example, salt, mono-diglycerides of fatty acids, yeast extract, natural flavorings, artificial flavorings, cream, glucono delta lactone, ammonium carbonate, sodium bicarbonate, xanthane, modified potato starch, potato vegetable fibers, sugar, water, and the like. The methods can further include, for example: passing a steam through the plurality of ingredients, wherein the steam melts the cheese and heats the mixture to a selected range of temperature; kneading the mixture for a period of time to create a dough or a dough-like composition. The range of temperature can be, for example, between 50° C. and 60° C.

DETAILED DESCRIPTION

To date, there is a shortage of relevant gluten-free food products in the market. For example, those suffering from celiac disease have today few options among crackers, since the majority of the products of this category are produced from flour containing gluten.

There is a need for gluten-free food compositions that can be used to produce healthy food alternatives for the gluten-intolerant population. Also needed are methods and systems for creating such gluten-free food compositions.

This invention is directed to gluten-free food compositions that comprise a cheese component, a starch component and a gluten-free flour component.

Definitions

Unless otherwise noted, terms are to be understood according to conventional usage by those of ordinary skill in the relevant art.

As used herein, the term "cheese" encompasses any types of cheese that can be used to render in a final fat content between 10% and 60% in the food composition. In some embodiments, semi-hard cheeses are used, for example, semi-hard yellow cheese.

As used herein, the term "starch" refers to any type of starch that can be used for food consumption. Starch used herein can be purified, semi-purified, or not purified.

As used herein, the term "gluten-free flour" refers to a powder or powder-like substance made of cereal grains, other seeds, or roots that do not contain gluten. The gluten-free flour used herein can be naturally gluten free or processed to reduce or eliminate its gluten content. As defined, powder can be used to encompass substances that are not fine; they can be coarse or even contain particles. For example, peanut flour can contain bits and pieces of the peanuts. In this sense, the peanut flour refers to a ground form of the peanuts.

As used herein, the term "flavor or taste modifying agent" refers to any food ingredient or additive that can be added to compositions of the present invention to alter the flavor or taste of the final food products made therefrom. Flavors and/or tastes contemplated in the present invention include but are not limited to sweetness, saltiness, bitterness, sourness, spiciness, or a combination thereof.

As used herein, the term "structure or textual modifying agent" refers to any food ingredient or additive that can be added to compositions of the present invention to alter the structure or textual of the final food products made therefrom. For example, more starch can be added to create a "lighter" food product while more gluten-free flour can be added to create a "heavier" or more substantive food product.

As used herein, the term "ingredient" generally refers to any substance that is found in a significant quantity in the final food composition, for example, anything that is around or over 5% by weight.

As used herein, the term "additive" generally refers to any substance that is found in a small quantity in the final food composition, for example, anything that is around or under 5% by weight. In some embodiments, especially when the quantity of the substance is relatively small (e.g., less than 10% by weight), ingredient and additive are used interchangeably.

Exemplary Ingredients and Additives

In some embodiments, this invention is directed to blending of the following materials, in the form of powder. Potato starch, yeast extract, salt, cheese aroma, rice flour, corn flour, corn starch, modified corn starch, potato vegetable fibers, sugar, disphosphoric acid disodium salt, ammonia, soda and mono-diglycerides. In the following, exemplary types of ingredients and/or additives are provided with more details. One of skill in the art would understand that the exemplary ingredients and/or additive described herein are only provided by way of example and should not be used to limit the scope of the invention.

Exemplary Types of Cheese

Any type of cheese can be used in compositions of the present invention, including Cheddar, blue, leaf-wrapped, soft, hard, semi-soft, washed-rind, semi-firm, firm and mountain cheese. In some embodiments, cheeses used herein belong to the category of semi-hard and hard cheeses. In some embodiments, the cheeses have a mild taste, not strong salinity and almost no aroma. In some embodiments, the cheeses have a high content in calcium and fat, which facilitates the absorption of calcium from the human body.

In some embodiments, one or more semi-hard yellow cheeses or a combination of different semi-hard or hard cheeses in specific proportions are used for the achievement of the desired flavor.

In some embodiments, only one type of cheese is used in obtaining the composition. In some embodiments, multiple types of cheese are used in obtaining the composition. For example, two or more types of cheese, three or more types of cheese, four or more types of cheese, five or more types of cheese, six or more types of cheese, seven or more types of cheese, or ten or more types of cheese can be used in obtaining the composition.

In some embodiments, the cheeses used herein include but are not limited to Mozzarella, Provolone, Cheddar, Edam, Feta, Gouda, Parmesan, Colby, Taleggio, Affidelice, Epoisses, Manchester, Dorset, Livarot/Artisanal, Pont l'Evêque, Abbaye de Tamie, Sentinelle, Schaf Reblochon, Fromage de Meaux, Brie de Nangis, Forsterkase, Monte Enebro, Banon de Chalais, Nettle Meadow Kunik, Flada, Coulommiers, Old Kentucky Tomme, Chabichou du Poitou, Torta del Casar, Saint Marcellin, Ossau Iraty, Fleur du Maquis, Flixer, Fontina Val d'Aosta, Garrotxa, Ibores, Beermat/Aarauer Bierdeckel, Morbier, Majorero, Pimenton, Bianco Sardo di Moliterno, Cravero Parmigiano Reggiano, Piave, Sbrinz, Pecorino Toscano Stagionato, Pecorino Sardo, Pecorino delle Balze Volteranne, and Roomano. In preferred embodiments of the present invention, cheese with little or mild flavor is used to form the composition.

In some embodiments, the cheese used herein has a fat content over 10% 20%, 25%, 30%, 35%, 40%, 45%, 50%, 60%, 70%, 80% or 90% by weight. In some embodiments, the cheese used herein is a processed semi-hard yellow cheese.

In some embodiments, the cheese content of the composition of the present invention has a fat content between 10% and 60% by weight. In some embodiments, the cheese content of the composition of the present invention has a fat content between 25% and 50% by weight; between 25% and 35% by weight; between 25% and 30% by weight; between 30% and 35% by weight; between 30% and 45% by weight; between 30% and 40% by weight; between 40% and 45% by weight; between 40% and 50% by weight; between 45% and 60% by weight; between 50% and 60% by weight; and between 55% and 60% by weight. Advantageously, in some embodiments, the composition has a cheese content between 30% and 45% by weight. Also advantageously, in some embodiments, the composition has a cheese content between 25% and 35% by weight.

In some embodiments, cheese constitutes between 20% to 50% by weight of the final weight of a food composition. In some embodiments, cheese components constitute over 10% by weight, over 15% by weight, over 20% by weight, over 25% by weight, over 30% by weight, over 35% by weight, over 40% by weight, over 45% by weight, over 50% by weight, over 55% by weight, or over 60% by weight, of the entire weight of the compositions.

It will be understood by one of skill in the art that the percentages provided here are approximate estimates instead of precise measures.

In some embodiments, one or more types of cheese are ground into powder form before being mixed with other ingredients to form the composition of the present invention. In some embodiments, one or more types of cheese are melted before being mixed with other ingredients to form the composition of the present invention. In some embodiments, cheese flavoring can be added to the composition to enhance the cheese flavor of the food composition.

Exemplary Types of Starch

Any type of starch can be used in embodiments of the present invention because starch does not contain gluten. Starch extracted from any food source can be used. Starch is the most important carbohydrate in the human diet and is contained in many staple foods. In some embodiments, the starch component in the composition of the present invention is derived from rice, wheat, maize (corn), potatoes, and cassava. Potato starch flour is obtained by grinding the tubers to a pulp and removing the fiber and protein by water-washing procedures. Potato starch (flour) is a white starch powder often used as a thickening agent. Standard (native) potato starch needs boiling, to thicken in water, giving a transparent gel.

In some embodiments, starch from other sources can be used, including arrowroot, arracacha, buckwheat, barley, oat, millet, rye, banana, breadfruit, canna, colacasia, katakuri, kudzu, malanga, oca, polynesian arrowroot, sago, sorghum, sweet potato, taro, water chestnut and yams. In some embodiments, chestnuts and edible beans, such as fava beans, lentils, mung bean and peas, are also rich in starch and can be used to extract starch.

In some embodiments, purified starch from a single source is used such as potato starch, cornstarch, or any one of the type described hereinabove. In some embodiments, purified starch from different sources can be used. In some embodiments, purified starch, semi-purified starch or unpurified starch can be mixed together and used in embodiments of the present invention.

In some embodiments, only one type of starch is used in obtaining the composition. In some embodiments, a plurality of types of starch is used in obtaining the composition. For example, two or more types of starch, three or more types of starch, four or more types of starch, five or more types of starch, six or more types of starch, seven or more types of starch, or ten or more types of starch can be used in obtaining the composition.

In some embodiments, the starch content of the composition of the present invention is between 20% and 40% by weight. In some embodiments, the composition has a starch content between 30% and 40% by weight. Advantageously, the total starch content of the composition of the present invention is between 35% and 40% by weight. Advantageously, the composition has a total starch content between 25% and 35% by weight. In some embodiments, the composition has a starch content between 10% and 60% by weight. In some embodiments, the composition has a starch content between 25% and 50% by weight; between 25% and 35% by weight; between 25% and 30% by weight; between 30% and 35% by weight; between 30% and 45% by weight; between 30% and 40% by weight; between 40% and 45% by weight; between 40% and 50% by weight; between 45% and 60% by weight; between 50% and 60% by weight; and between 55% and 60% by weight. Advantageously, in some embodiments, the composition has a starch content between 30% and 45% by weight. Also, advantageously, in some embodiments, the composition has a starch content between 25% and 35% by weight.

It will be understood by one of skill in the art that the percentages provided here are approximate estimates instead of precise measures.

In some embodiments, one or more types of starch are ground into powder form before being mixed with other ingredients to form the composition of the present invention. In some embodiments, one or more types of starch are blended or smashed together before being mixed with other ingredients to form the composition of the present invention. In some embodiments, one or more types of starch are added as particles or chunks before being mixed with other ingredients to form the composition of the present invention.

Exemplary Types of Flour

Any type of flour that is naturally gluten-free or processed to reduce or eliminate its gluten content can be used in the present invention. In some embodiments, the one or more flour used herein is selected from the group consisting of amaranth flour, bean flour, buckwheat flour, cassava flour, chestnut flour, chickpea flour, Chuño flour, corn flour, and maida flour.

Amaranth flour is a type of flour produced from ground amaranth grain. It was commonly used in pre-Columbian meso-American cuisine. It is becoming more and more available in specialty food shops. Amaranth flour is important in Indian and Pakistani cuisine, used for a range of breads such as roti, naan and chapati. Bean flour is a type of flour produced from pulverized dried or ripe beans such as fava beans, soybeans, lentils, red beans, mung bean and peas. Buckwheat flour is used as an ingredient in many pancakes in the United States. Cassava flour is made from the root of the cassava plant. In a purified form (pure starch), it is called tapioca flour. Chestnut flour is popular in Corsica, the Périgord and Lunigiana for breads, cakes and pastas. It is the original ingredient for "polenta." still used as such in Corsica and other Mediterranean locations. Chestnut bread keeps fresh for as long as two weeks. In other parts of Italy it is mainly used for desserts. Chickpea flour (also known as gram flour or besan) is of great importance in Indian cuisine, and in Italy, where it is used for the Ligurian farinata. Chuño flour made from dried potatoes in various countries of South America. Corn (maize) flour is popular in the Southern and Southwestern US, Mexico, South America, and Punjab regions of India and Pakistan, where it called as Makkai Ka Atta. Coarse whole-grain corn flour is usually called corn meal. Finely ground corn flour that has been treated with food-grade lime is called masa harina (see masa) and is used to make tortillas and tamales in Mexican cooking Corn flour should never be confused with cornstarch, which is known as "corn flour" in British English. Cornstarch is powdered endosperm of the corn kernel. Maida flour is a type of finely milled wheat flour used to make a wide variety of Indian breads such as paratha and naan. Maida is widely used not only in Indian cuisine but also in Central Asian and Southeast Asian cuisine. Though sometimes referred to as "all-purpose flour" by Indian chefs, it more closely resembles cake flour or even pure starch. Noodle flour is a special blend of flour used for the making of Asian-style noodles. The flour could be from wheat or rice.

In some embodiments, the one or more types of flour used herein are selected from the group consisting of nut flour, cornmeal, peasemeal or pea flour, peanut flour, rice flour, and potato flour. Nut flours are grated from oily nuts, most commonly almonds and hazelnuts, and are used instead of or in addition to wheat flour to produce more dry and flavorful pastries and cakes. Almond flour is made from ground almond nuts. Nuts from fruits and seeds that can be used in the present invention include but are not limited to Almonds, pecans, walnuts, Brazil nut, candle nut, cashew nut, Gevuina nut, chestnut, pine nut, Macadamia nut, Mongongo nut, Peanut, Pistachio nut, hazelnuts, and hickories. In some embodiments, seeds such as sesame seeds, pumpkin seeds, watermelon seeds, or sunflower seeds, can also be used in the present inventions.

In some embodiments, the seeds or nuts used herein may be freshly ground into paste or as dried powder form. In alternative embodiments, nuts or seeds can be added as chopped up bits to add flavor and texture to the final food products.

Peasemeal or pea flour is a type of flour produced from roasted and pulverized yellow field peas. Peanut flour made from shelled/cooked peanuts is a higher protein alternative to using regular flour. Rice flour is made from ground kernels of rice. It is used in Western countries and especially for people who suffer from gluten intolerance, since rice does not contain gluten. Glutinous rice flour or sticky rice flour is often used in east and Southeast Asian cuisines. Brown rice flour is of great importance in Southeast Asian cuisine, often used to make edible rice paper. Potato flour, often confused with potato starch, is a peeled, cooked potato, mashed, mostly drum dried and ground potato flakes using the whole potato and thus containing the protein and some of the fibers of the potato; having an off-white slight yellowish color. Dehydrated potatoes or instant mashed potatoes can also be granular or flakes. Potato flour is cold water-soluble.

In some embodiments, the one or more types of flour used herein are selected from the group consisting of rye flour, tapioca flour, and teff flour. Rye flour is used to bake the traditional sourdough breads of Poland, Germany and Scandinavia. Pumpernickel bread is usually made exclusively of rye, and contains a mixture of rye flour and rye meal. Tapioca flour, produced from the root of the cassava plant, is used to make breads, pancakes, tapioca pudding, and a savory porridge called fufu in Africa. It can also be used as a type of starch. Teff flour is made from the grain teff, and is of considerable importance in eastern Africa (particularly around the horn of Africa).

In some embodiments, flour can also be made from soybeans, peanuts, arrowroot, taro, cattails, acorns, qinoa and other non-cereal foodstuffs. In some embodiments, a variety of other seeds are also used to make flour for bread, these include: *Acacia aneura* (mulga), *Acacia cowleana, Acacia estrophiolata* (ironweed), *Acacia ligulata* (umbrella bush), *Acacia murrayana* (tjuntjula), *Acacia tetragonophylla* (wakalpulka), *Acacia kempeana* (Witchetty bush), *Acacia coriacea* (Wiry wattle), *Panicum* spp. (eg *Panicum australiense, Panicum decompositum, Panicum effusum*), *Astrelba pectinata* (Mitchell grass), *Portulaca oleracea, Portulaca intraterranea, Oryza sativa, Marsilea drummondii* (Nardoo), *Atriplex nummularia* (Old man saltbush), *Acacia notabilis, Acacia pyrifolia, Acacia tetragonophylla, Acacia victoriae, Acacia sophorae, Acacia stenophylla, Acacia tumida, Aleurites moluccana, Amaranthus mitchellii, Amaranthus grandiflorus, Brachiaria piligera, Brachiaria milliformis, Brachychiton diversifolium, Brachychiton gregorii, Brachychiton paradoxum, Brachychiton populneum, Bruguiera rheedii, Calandrinia balonensis, Canarium australianum, Canavalia maritima, Entada phaseolides, Eragrostris eriopoda* (Wangunu), *Eucalyptus leptopoda, Eucalyptus microtheca, Nymphae gigantea, Rhyncharrhena linearis,* and *Themeda australis.*

One of skill in the art will further understand that any other type of food product with little or no gluten can be used often in a powder form or a non-powder form. For example, mashed potato can be used to form the composition of the present invention. Alternatively, dried flakes of starch containing products that can readily be broken up upon mixing and addition of water can also be used in the present invention.

In some embodiments, only one type of flour is used in obtaining the composition. In some embodiments, more than one type of flour are used in obtaining the composition. For example, two or more types of flour, three or more types of flour, four or more types of flour, five or more types of flour, six or more types of flour, seven or more types of flour, or ten or more types of flour can be used in obtaining the composition.

In some embodiments, the flour content of the composition of the present invention is between 20% and 40% by weight. In some embodiments, the composition has a flour content between 30% and 40% by weight. Advantageously, the flour content of the composition of the present invention is between 35% and 40% by weight. Advantageously, the composition has a flour content between 25% and 35% by weight. In some embodiments, the composition has a flour content between 10% and 60% by weight. In some embodiments, the composition has a flour content between 25% and 50% by weight; between 25% and 35% by weight; between 25% and 30% by weight; between 30% and 35% by weight; between 30% and 45% by weight; between 30% and 40% by weight; between 40% and 45% by weight; between 40% and 50% by weight; between 45% and 60% by weight; between 50% and 60% by weight; and between 55% and 60% by weight. Advantageously, in some embodiments, the composition has a flour content between 30% and 45% by weight. Also advantageously, in some embodiments, the composition has a flour content between 25% and 35% by weight.

It will be understood by one of skill in the art that the percentages provided here are approximate estimates instead of precise measures.

In some embodiments, one or more types of flour are ground into powder form before being mixed with other ingredients to form the composition of the present invention. In some embodiments, one or more types of flour are blended or smashed together before being mixed with other ingredients to form the composition of the present invention. In some embodiments, one or more types of flour are added as particles or chunks before being mixed with other ingredients to form the composition of the present invention.

It will be understood by one of skill in the art that the types of cheese, flour, and/or starch described herein are provided as examples only and should not be used to limit the scope of the present invention. The quantities of the cheese, starch and flour component in the composition can be adjusted interdependently. For example, if cornstarch is used in a larger quantity, a smaller amount of potato starch can be used. In embodiments in accordance with the present invention, the final cheese content is generally between 20% and 40% by weight, potato starch is generally between 20% and 40% by weight, rice flour is generally between 1% to 10% by weight, corn flour is generally between 1% to 10% by weight, and modified potato starch is generally between 0.5% to 5% by weight.

Several grains and starch sources are considered acceptable for a gluten-free diet. The most frequently used are corn, potatoes, rice, and tapioca (derived from cassava). Other grains and starch sources generally considered suitable for gluten-free diets include amaranth, arrowroot, millet, montina, lupin, quinoa, sorghum (jowar), sweet potato, taro, teff, chia seed, and yam. Various types of bean, soybean, and nut flours are sometimes used in gluten-free products to add protein and dietary fiber. In spite of its name, buckwheat is not related to wheat; pure buckwheat is considered acceptable for a gluten-free diet, although many commercial buckwheat products are actually mixtures of wheat and buckwheat flours, and thus not acceptable. Gram flour, derived from chickpeas, is also gluten-free (this is not the same as Graham flour made from wheat).

Modifying Additives

In embodiments in accordance with the present invention, additional ingredients and/or additives can be added to modify the texture, taste and structural integrity of the compositions and the food product made therefrom. In some embodiments, aromas, various pastes, as well as flavorings and toppings are added for the production of food products of additional tastes.

It will be understood by one of skill in the art that an ingredient added for modifying the texture/structure integrity of the final food product can also modify the taste. For example, cream can be added to provide a consistency in flavor and smoothness in texture for the final food product (e.g., a cracker, a cookie, a cake, chips, bread-sticks or the like). In some embodiments, the cream content of the composition is between 5% and 15%. In alternative embodiments, nuts or seeds can be added as chopped up bits to add flavor and texture to the final food products, for example, to provide a crunchy texture.

Flavor and/or tastes contemplated in the present invention include but are not limited to sweetness, saltiness, bitterness, sourness, spiciness, eggs or egg flavor, a cheese flavor, a fruit flavor, a nut flavor, a vegetable flavor, a meat flavor, or a combination thereof. The flavor or taste can be added by putting into the composition one or more natural or artificial flavors, natural raw materials, additives, or aromas. Exemplary flavor/taste additives include but are not limited to olive paste/pieces/bits, sun-dried tomato paste/pieces/bits, onion, paste/pieces/bits, green onion paste/pieces/bits, chive paste/pieces/bits, pesto paste/pieces/bits, or a combination thereof.

In some embodiments, cheese flavoring can be added to the composition to give the food composition a distinctive cheese flavor while one or more mild cheese products are added as the main ingredients of the food composition.

In some embodiments, cheeses used belong to the category of semi-hard and hard cheeses. They have a mild taste, not strong salinity and almost no aroma. They have a high content in calcium and fat. Different types of cheese are used as a base. A combination of cheeses can be used to alter the taste significantly. Edam cheese is quite mild in taste, but if used in combination with another cheese like Cheddar or Parmesan, then the result is a much stronger taste.

In some embodiments, yeast extract in powder acts as a flavor enhancer, giving salinity and structural stability to the ingredients. Thus, sodium glutamate is naturally replaced, an additive which enhances flavor.

In some embodiments, salt is used for the enhancing of the product salinity, as well as for the homogenization of the dough. Salt can also be applied on top of the product before it is baked, giving an extra boost in the flavor strength of the final product.

In some embodiments, cream is added for the reinforcement of the fat percentages and taste. It is prepared by skimming, through simple centrifugation, i.e., a natural and simple way. In some embodiments, cream can be added in the process of dough-making at the same time when water is added. In some embodiments, cream can be added in the process of dough-making before or after water is added. In some embodiments, cream can be added after the dough is formed.

In some embodiments, sugar is added for a better taste, improved color and crunchiness.

In some embodiments, various fragrances enhance aroma and flavor, giving a distinguishing aroma and flavor to the product. If for example the desired result is a feta cheese flavor, then apart from real Feta a small percentage of natural Feta flavor can be used to give an extra aroma and flavor to the final product.

In some embodiments, there is also the possibility to apply a big range of different flavors on the top of the product before or after it has been baked. The flavorings come in the form of powder and can have a big range of potential flavors, like cheese, pizza, BBQ, herbs, bacon, chilli, and more. The flavorings are sprayed on top of the product and they stick to it when the product is baked.

In some embodiments, flavors of the food products are enhanced by adding real cheese on top of the product before it is baked. Then, cut dough in different shapes and/or sizes is baked with the Cheese on top. During baking the cheese melts and sticks to the product giving it an extra flavor. The flavor depends on the cheese that will be used, like Parmesan, Cheddar or Mozzarela.

Exemplary modifying components include but are not limited to salt (at 0.1% to 10% by weight), mono-diglycerides of fatty acids (at 0.1% to 6% by weight), yeast extract (at 0.1% to 5% by weight), natural or artificial flavorings (at 0.1% to 6% by weight), cream (at 1% to 25% by weight), glucono delta lactone (at 0.01% to 0.5% by weight), Ammonium Carbonate (at 0.01% to 0.5% by weight), Sodium Bicarbonate (at 0.01% to 0.5% by weight), Xanthane (at 0.01% to 1.5% by weight), modified Potato starch (at 0.1% to 15% by weight), potato vegetable fibers (at 0.5% to 10% by weight), sugar (at 0.1% to 20% by weight), and water (at 5% to 20% by weight). It will be understood by one of skill in the art that the percentages provided here are approximate estimates instead of precise measures.

In some embodiments, diphosphoric disodium at 0.03%-0.2% by weight, ammonia at 0.05%-0.2% by weight, and soda (dicarboxylic sodium) at 0.03%-0.2% by weight are added, for example, as raising agents.

In some embodiments, near-complete food compositions of the present inventions are pre-mixed in dry form, pre pre-packaged and sold in pre-measured quantities, such as 1 lb, 2 lbs, 5 lbs, 10 lbs, or 20 lbs or more. Alternatively, the pre-packaged near-complete compositions can be sold at 1 kg, 2 kgs, 5 kgs, 10 kgs, or 20 kgs or more. In these embodiments, the one or more ingredients will be added when a package is ready to be consumed. Such ingredients include but are not limited to water, cheese, egg, or flavoring components such as pesto paste, sun-dried tomato paste, and the like.

In some embodiments, compositions of the present invention are pre-packaged as wet dough and can be stored for later use in a refrigerator and/or a freezer.

In some embodiments, modifying additives are added to pre-formed dough to form the food compositions. In some embodiments, modifying additives are packaged separately in dry or wet form and can be added to food compositions before a food making process (e.g., baking or frying).

It will be understood by one of skill in the art that the major components, cheese, starch and/or gluten-free flour, can also be used to modify the flavor, texture, structure and/or taste of the final food product.

Process of Making the Dough

Adding and mixing ingredients. In embodiments in accordance with the present invention, most ingredients of the composition can be added together at the same time. In some embodiments, as described hereinabove, near-complete food compositions are mixed together in dry form.

In some embodiments, the food composition is obtained by blending materials in the form of powder: potato starch, yeast extraction, salt, cheese aroma, rice flour, corn flour, corn starch, modified corn starch, potato vegetable fibers, sugar, disphosphoric acid disodium salt, ammonia, soda and mono-diglycerides. In some embodiments, flakes, granular, cubes, or chunks of one or more ingredients are used to make the composition.

In some embodiments, the main ingredients are added first before the modifying or flavoring ingredients are added. In some embodiments, one or more cheeses are melted before being added to a mix of the dry components. In some embodiments, one or more dry components are added one by one to the melted cheese. In some embodiments, cheese is added in ground form or small pieces or chunks without being melted first.

In some embodiments, water is added to create a dough-like composition for making food product. In some embodiments, water is added prior to the mixing of the ingredients. In some embodiments, water is added after the ingredients are already mixed. In some embodiments, water is added while the ingredients are being mixed.

In some embodiments, water and melted cheese can be added at the same time, or individually in portions. In some embodiments, dry components are mixed prior to the addition of cheese or water. In some embodiments, one or more cheese is melted before being mixed with the dry components. In some embodiments, one or more dry components are added one by one to the melted cheese while being mixed. In some embodiments, cheese is added in ground form or small pieces or chunks without being melted first.

In some embodiments, the ingredients are placed in a container where they are well mixed for a certain period, while water is progressively added. After completing the addition of water, the mixture is blended for a certain period before it is rested so that the mixture is fully hydrated. After the end of the rest period, cream is added and the composition is further mixed for a specific time. The length of the time for mixing is determined by the quantities of the ingredients. Then, cheese is added at the cutter and mixed in with the other ingredients.

Heating and kneading. After the mixing step, a homogeneous or near homogeneous mixture in the form of paste/dough is taken to a receptacle such as, for example, a stainless tank, which is, for example a part of a kneading machine. The tank can be placed in a kneading machine, which, by elevation, seals the tank. In some embodiments, the kneading machine has stirrers, which knead the dough. The speed of the stirrers can be, for example, 100 turns per minute with an opposite movement. In alternative embodiments, the turning speed of the stirrers can be 20 turns per minute or more, 40 turns per minute or more, 60 turns per minute or more, 80 turns per minute or more, 100 turns per minute or more, 120 turns per minute or more, 150 turns per minute or more, 200 turns per minute or more, or 250 turns per minute or more.

In some embodiments, dry steam, at a temperature of approximately 150° C., is simultaneously supplied. In some embodiments, an accessible steam temperature can range between 110° C. until 180° C. In some embodiments, an accessible steam temperature can be 40° C. or above; 50° C. or above; 60° C. or above; 70° C. or above; 80° C. or above; 90° C. or above; 100° C. or above; 110° C. or above; 120° C. or above; 130° C. or above; 140° C. or above; 150° C. or above; 160° C. or above; or 170° C. or above. In some embodiments, the hot steam melts the cheese, which is the basic ingredient and mixes all the ingredients until a near homogenous/uniform dough is achieved. In some embodiments, the final dough has a temperature of 50° C.-60° C.; 40° C.-70° C.; 45° C.-70° C.; 30° C.-60° C.; 40° C.-50° C.; 52° C.-66° C.; or 50° C.-70° C. In some embodiments, the acceptable temperature of the dough is 50° C.-55° C. In some embodiments, the acceptable temperature of the dough is 55° C.-60° C. The quantity of steam for elevation at the upper level is approximately 4.5 liters. In some embodiments, an acceptable steam quantity is between 1 liter to 10 liters; between 2 liters to 6 liters; between 3 liters to 5 liters; between 4 liters to 6 liters; or between 3 liters to 7 liters. As used herein, the volumes provided reflect the volume of water that is converted into steam form, not the steam volume.

It will be understood by one of skill in the art that the steam temperature, dough temperature, and steam volume are provided as approximate estimates instead of precise measurements. In some embodiments, steam temperature, dough temperature, and/or steam volume can be adjusted interdependently. For example, when a low steam temperature is used the dough making process can take longer, which can be used with to protect more delicate ingredients or additives, such as cheese and/or flavors that are more temperature sensitive.

After the completion of this stage, the supply of steam stops and the tank is taken out of the kneading machine. Kneading, within the above temperature, steam and steam temperature limits, may last two to six minutes.

Dry steam injection as described herein is provided as a means of heating. It will be understood by one of skill in the art that other means of heating can also be used in the present invention; for example, hot water batch, heating via jacket. It will also be understood by one of skill in the art that the steam quantity used depends on dough quantity per batch: larger batches of dough would require more steam.

In alternative embodiments, cheese can be pre-melted and added to the dry mix to form the final dough. In some embodiments, the cheese-containing dough is packaged and frozen for long-term storage purposes. In some embodiments, the cheese-containing dough can be sold as a pre-made kit in markets. A consumer can further add one or more desired flavors to the dough-like composition prior to further processing of the composition, such as baking, steaming, and frying of the dough.

Process of Making Food Products

Food products as used in the present invention include but are not limited to final food product crackers, cookies, cakes, chips, bread-sticks, or the like.

In some embodiments for large production, baking takes place in tunnel ovens. In some embodiments, tunnel ovens range in size from 12 meters to over 120 meters long. In some embodiments, food compositions in the dough-forms are cut into any shapes (e.g., a cookie, cake, chip, or bread-stick) and transferred by a belt and positioned on an oven belt. In some embodiments, the cuts products are transferred from one side of the oven to the other, and are baked with the appropriate temperatures which change depending on the stage of baking.

In some embodiments, the baking process is divided into stages. In the first stage, a higher temperature is needed to dry the product from its humidity. In the stages after that the color, texture and crunchiness of the product are achieved, depending on the baking profile.

The temperatures at which the baking process takes place can vary widely, depending on the size of the oven, the speed in which bake is desirably done, the band which is used, the type and size of the products, and the desirable end result. Depending on the type of product there can be some slight variations in two aspects of the oven: the band type and the type of heating used in the oven.

For products like crackers and specific snacks a wire-mesh band is used which allows the air to go through and there is usually direct gas heating. In cookie products, cakes and bread-sticks a steel band is usually used and there is usually air heating.

In some embodiments, the final food products are made by frying the dough made from the food composition. In some embodiments, the final food products are made by baking, frying, steaming, or a combination thereof.

Baking, steaming, and frying temperatures are within the ranges known to those of skill in the art, and are determined according to the ingredients and conditions specific to the product to be made and the equipment to be used. Any baking, steaming, and/or frying temperature suitable for obtaining the product is considered to be within the scope of the embodiments of the invention.

Additional information useful in relation to selecting, processing, cooking and/or packaging the compositions and products of embodiments of the invention is disclosed in the following patents and published applications: US 2005/0106303; US 2006/0083842; US 2007/0092620; US 2007/0116846; US 2007/0160728; US 2009/0220654; US 2010/0015279; U.S. Pat. Nos. 5,095,008; 5,344,663; 5,827,974; 5,939,127; 6,322,841; 6,451,367; 6,479,090; 7,371,421; 7,595,081; 6,541,060; EP 2042042; EP 2100511; and WO 00/27210; and in Saklar, et al. 1999, "Instrumental Crispiness and Crunchiness of Roasted Hazelnuts and Correlations with Sensory Assessment," *Journal of Food Science* 64(6):1015-1019. Each of the foregoing is incorporated by reference in its entirety, for its teachings as specified in this paragraph.

Unless otherwise noted, terms are to be understood according to conventional usage by those of ordinary skill in the relevant art. Having described the invention in detail, it will be apparent that modifications, variations, and equivalent embodiments are possible without departing the scope of the invention defined in the appended claims. Furthermore, it should be appreciated that all examples in the present disclosure are provided as non-limiting examples.

EXAMPLES

The following non-limiting examples are provided to further illustrate embodiments of the invention disclosed herein. It should be appreciated by those of skill in the art that the techniques disclosed in the examples that follow represent approaches that have been found to function well in the practice of the invention, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the invention.

Example 1

Dough-Making Process

Blocks of cheese were first added at a cutting machine to turn it into powder. Then, the cheese and the dry ingredients were placed in a mixture where they were well mixed for between 2 to 6 minutes, while water and cream were progressively added. After completing the addition of water and cream, the mixture was blended for 2 to 5 minutes before it was rested for 20 to 120 minutes, so that the mixture was fully hydrated. The length of the time for mixing was determined by the quantities of the ingredients. Each batch had a total of 50 kg of ingredients. Each batch was mixed in three minutes intervals and then left to rest for 30-40 minutes.

After the mixing step, a homogeneous or near homogeneous mixture in the form of paste/dough was taken to a stainless tank, which was a part of the kneading machine. The tank was placed in the kneading machine, which, by elevation, sealed the tank. The kneading machine has stirrers, which knead the dough. The speed of the stirrers was 100 turns per minute with an opposite movement. Dry steam, at approximately 150° C., was simultaneously supplied. An accessible steam temperature may range from 110° C. to 180° C. The steam melted the cheese, which was the basic ingredient, and mixed all the ingredients until a near homogenous/uniform dough was achieved, which had a temperature 50° C.-60° C. The acceptable temperature of the dough is generally between 45° C.-70° C. The quantity of steam for elevation at the upper level was approximately 4.5 liters. An acceptable steam quantity is generally about 3 liters to 7 liters. After the completion of this stage until the dough reached the temperature of 58 C (+/−3 C) or until the dough was workable, stirring was needed to make the dough. The supply of steam stopped and the tank was taken out of the kneading machine. Kneading, within the above temperature, steam and steam temperature limits, lasted two to six minutes.

Example 2

Modifying Structure

Starch is a cereal product and one of the most basic elements of modern nutrition. It is widely used in a natural or a modified form, as a source of carbohydrates, a thickener, a stabilizer and a binding ingredient. The basic sources are corn, wheat and potato. Furthermore, rice flour, barley starch and yam starch are known for their applications. The starch forms for the production of food, as well as industrial and pharmaceutical applications, is normal, pre-steamed, cationic and modified. Normal natural potato starch was used for the preparation of crackers, taken from the industrial processing of potatoes, by natural methods, and served as a source of carbohydrates, thickener, stabilizer and binding ingredient. For the same reasons, corn flour, corn starch and modified corn starch were added. Embodiments of the invention constitute an innovative product in the cracker industry, the basic advantage being that it does not contain gluten, such as wheat and corn flours. It has long life and is stored in cool places, without being at any risk in case of large changes in temperatures.

Rice flour was used to reinforce structure. It has an excellent combination of digestible amino acids, gluten-free and non-allergenic. It was prepared without the use of radiation; it is odorless and savorless, not affecting the end product.

Ammonium carbonate at around 0.2% by weight, glycono delta- lactone at 0.1% by weight, and sodium bicarbonate at 0.1% by weight were added.

Mono-diglycerides at 0.5%-2% by weight were used as emulsifying agents for the end product, giving an excellent and acceptable texture and appearance. Xanthane at 0.05%-0.5% by weight has a similar role, which also enhances the stability of the cracker structure. Potato vegetable fibers at 1%-5% by weight reinforce the product due to their property to absorb and retain water in quantities multiple than their weight. Mono- and di-glycerides of fatty acids 0.8%, xanthan gum 0.3% were added.

Example 3

Modifying Taste

The aromas, various pastes, as well as flavorings and toppings were added for the production of food products of additional tastes.

Cheeses belong to the category of semi-hard and hard cheeses. They have a mild taste, not strong salinity and almost no aroma. They have a high content of calcium and fat. Different types of cheese were used as a base. A combination of cheeses can be used to alter the taste significantly. Edam cheese is quite mild in taste, but if used in combination with another cheese like Cheddar or Parmesan, the result is a much stronger taste.

Yeast extract (at 0.5% to 2% by weight) in powder or wet form was added as a flavor enhancer, giving salinity and structural stability to the ingredients. Thus, sodium glutamate was naturally replaced, an additive which enhanced flavor.

Salt (at 0.5% to 5% by weight) was used to enhance the product salinity, as well as for the homogenization of the dough. Salt can also be applied on top of the product before it is baked, giving an extra boost in the flavor strength of the final product.

Cream (at 5% to 15% by weight) was added for the reinforcement of the fat percentages and taste. It was prepared by skimming, through simple centrifugation, i.e., a natural and simple way.

Sugar (at 0.5% to 20% by weight) was added for a better taste, improved color and crunchiness.

Ammonium carbonate at around 0.2% by weight, glycono delta-lactone at 0.1% by weight, and sodium bicarbonate at 0.1% by weight were added.

Various fragrances, such as natural or artificial flavorings at 0.5% to 2% by weight, were used to enhance aroma and flavor, giving a distinguishing aroma and flavor to the product. If for example the desired result is a feta cheese flavor, then apart from real Feta a small percentage of natural Feta flavor can be used to give an extra aroma and flavor to the final product.

There is also the possibility to apply a big range of different flavors on the top of the product before or after it has been baked. The flavorings come in the form of powder and can have a big range of potential flavors, like cheese, pizza, BBQ, herbs, bacon, chili, and more. The flavorings are sprayed on top of the product and they stick to it when the product is baked.

Another possibility to enhance flavor is by adding real cheese on top of the product before it is baked. Then the product is baked with the cheese on top. During baking the cheese melts and sticks to the product giving it an extra flavor. The flavor depends on the cheese used, like Parmesan, Cheddar or Mozzarella.

Mono-diglycerides of fatty acids (at 0.5% to 2% by weight), glucono delta lactone (at 0.03% to 0.2% by weight), Ammonium Carbonate (at 0.05% to 0.2% by weight), Sodium Bicarbonate (at 0.03% to 0.2% by weight), Xanthane (at 0.05% to 0.5% by weight), modified Potato starch (at 0.5% to 5% by weight), potato vegetable fibers (at 1% to 5% by weight), and water (at 5% to 20% by weight) were added.

Example 4

Exemplary Compositions

Exemplary ingredients of the food composition described herein are summarized in Table I as follows. Percentage ranges of the exemplary ingredients are also listed in Table I.

TABLE I

Exemplary ingredients

| Ingredients | Percentage by Weight |
|---|---|
| Cheese | 20%-40% |
| Potato starch | 20%-40% |
| Salt | 0.5%-5% |
| Mono-diglycerides of fatty acids | 0.5%-2% |
| Yeast extract | 0.5%-2% |
| Edam aroma | 0.2%-2% |
| Cream | 5%-15% |
| Rice flour | 1%-10% |
| Diphosphoric disodium | 0.03%-0.2% |
| Ammonia | 0.05%-0.2% |
| Dicarboxylic sodium | 0.03%-0.2% |
| Xanthane | 0.05%-0.5% |
| Corn flour | 1%-10% |

TABLE I-continued

Exemplary ingredients

| Ingredients | Percentage by Weight |
|---|---|
| Corn starch | 1%-5% |
| Modified corn starch | 0.5%-5% |
| Potato vegetable fibers | 1%-5% |
| Sugar | 0.5%-20% |
| Water | 5%-20% |

Example 5

Additional Exemplary Compositions—Pesto Flavor

An exemplary recipe of the food composition described herein is shown in Table II:

TABLE II

Exemplary ingredients

| Recipe for Pesto | Weight (Kg) | Percentage |
|---|---|---|
| Edam Cheese | 11.1 | 25.01 |
| Potato Starch | 15.709 | 35.4 |
| Salt | 0.56 | 1.26 |
| Mono-Di-Glycerides | 0.56 | 1.26 |
| Yeast Extract | 0.2 | 0.45 |
| Milk Cream | 5 | 11.27 |
| Rice Flour | 2.25 | 5.07 |
| GDL | 0.04 | 0.09 |
| Ammonium Bicarbonate | 0.1 | 0.23 |
| Sodium Bicarbonate | 0.12 | 0.27 |
| Xanthan Gum | 0.14 | 0.32 |
| Corn Flour | 3.08 | 6.94 |
| Corn Starch | 1.04 | 2.34 |
| Modified Potato Starch | 0.8 | 1.8 |
| Potato Fibers | 1.6 | 3.61 |
| Sugar | 1.5 | 3.38 |
| Sun-Dried Tomato | 0.192 | 0.43 |
| Sun-Dried Tomato flavor | 0.08 | 0.18 |
| Pesto Pasta | 0.192 | 0.43 |
| Garlic | 0.065 | 0.15 |
| Basil | 0.05 | 0.11 |
| Total Weight | 44.378 | |

Example 6

Additional Exemplary Compositions—Parmesan & Sun-Dried Tomato Flavor

An exemplary recipe of the food composition described herein is shown in Table III:

TABLE III

Exemplary ingredients

| Recipe for Parmesan & Sun-Dried Tomato | Weight (Kg) | Percentage |
|---|---|---|
| Edam Cheese | 11.1 | 24.63% |
| Parmesan Cheese | 1 | 2.22% |
| Potato Starch | 15.7 | 34.84% |
| Salt | 0.56 | 1.24% |
| Mono-Di-Glycerides | 0.56 | 1.24% |
| Yeast Extract | 0.2 | 0.44% |
| Milk Cream | 5 | 11.10% |
| Rice Flour | 2.25 | 4.99% |
| GDL | 0.04 | 0.09% |
| Ammonium Bicarbonate | 0.1 | 0.22% |

TABLE III-continued

Exemplary ingredients

| Recipe for Parmesan & Sun-Dried Tomato | Weight (Kg) | Percentage |
| --- | --- | --- |
| Sodium Bicarbonate | 0.12 | 0.27% |
| Xanthan Gum | 0.14 | 0.31% |
| Corn Flour | 3.08 | 6.84% |
| Corn Starch | 1.04 | 2.31% |
| Modified Potato Starch | 0.8 | 1.78% |
| Potato Fibers | 1.6 | 3.55% |
| Sugar | 1.5 | 3.33% |
| Sun-Dried Tomato | 0.192 | 0.43% |
| Sun-Dried Tomato flavor | 0.08 | 0.18% |
| Total Weight | 45.062 | 100.00% |

Example 7

Additional Exemplary Compositions—Cheddar with Cheddar Flavoring Applied on Top

An exemplary recipe of the food composition described herein is shown in the following Table IV.

TABLE IV

Exemplary ingredients

| Recipe for Cheddar with Cheddar flavoring applied on top | Weight (Kg) | Percentage |
| --- | --- | --- |
| Edam Cheese | 11.1 | 24.11% |
| Cheddar Cheese | 1 | 2.17% |
| Potato Starch | 15.7 | 34.10% |
| Salt | 0.56 | 1.22% |
| Mono-Di-Glycerides | 0.56 | 1.22% |
| Yeast Extract | 0.2 | 0.43% |
| Milk Cream | 5 | 10.86% |
| Rice Flour | 2.25 | 4.89% |
| GDL | 0.04 | 0.09% |
| Ammonium Bicarbonate | 0.1 | 0.22% |
| Sodium Bicarbonate | 0.12 | 0.26% |
| Xanthan Gum | 0.14 | 0.30% |
| Corn Flour | 3.08 | 6.69% |
| Corn Starch | 1.04 | 2.26% |
| Modified Potato Starch | 0.8 | 1.74% |
| Potato Fibers | 1.6 | 3.48% |
| Sugar | 1.5 | 3.26% |
| Paprika | 0.25 | 0.54% |
| Cheddar Flavoring | 1 | 2.17% |
| Total Weight | 46.04 | 100.00% |

Example 8

Additional Exemplary Compositions—Feta, Oregano & Olive Oil

An exemplary recipe of the food composition described herein is shown in the following Table V.

TABLE V

Exemplary ingredients

| Recipe for Feta, Oregano & Olive Oil | Weight (Kg) | Percentage |
| --- | --- | --- |
| Edam Cheese | 11.1 | 24.78% |
| Feta Cheese | 0.7 | 1.56% |
| Potato Starch | 15.7 | 35.05% |
| Salt | 0.56 | 1.25% |
| Mono-Di-Glycerides | 0.56 | 1.25% |
| Yeast Extract | 0.2 | 0.45% |
| Milk Cream | 5 | 11.16% |
| Rice Flour | 2.25 | 5.02% |
| GDL | 0.04 | 0.09% |
| Ammonium Bicarbonate | 0.1 | 0.22% |
| Sodium Bicarbonate | 0.12 | 0.27% |
| Xanthan Gum | 0.14 | 0.31% |
| Corn Flour | 3.08 | 6.88% |
| Corn Starch | 1.04 | 2.32% |
| Modified Potato Starch | 0.8 | 1.79% |
| Potato Fibers | 1.6 | 3.57% |
| Sugar | 1.5 | 3.35% |
| Oregano | 0.15 | 0.33% |
| Olive Oil | 0.15 | 0.33% |
| Feta flavoring | 0.1 | 0.22% |
| Total Weight | 44.79 | 100.00% |

The various methods and techniques described above provide a number of ways to carry out the invention. Of course, it is to be understood that not necessarily all objectives or advantages described may be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as may be taught or suggested herein. A variety of advantageous and disadvantageous alternatives are mentioned herein. It is to be understood that some preferred embodiments specifically include one, another, or several advantageous features, while others specifically exclude one, another, or several disadvantageous features, while still others specifically mitigate a present disadvantageous feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be mixed and matched by one of ordinary skill in this art to perform methods in accordance with principles described herein. Among the various elements, features, and steps some will be specifically included and others specifically excluded in diverse embodiments.

Although the invention has been disclosed in the context of certain embodiments and examples, it will be understood by those skilled in the art that the embodiments of the invention extend beyond the specifically disclosed embodiments to other alternative embodiments and/or uses and modifications and equivalents thereof.

Many variations and alternative elements have been disclosed in embodiments of the present invention. Still further variations and alternate elements will be apparent to one of skill in the art. Among these variations, without limitation, are the specific percentages of ingredients used in a food composition. It will be understood by one of skill in the art that the percentages provided are approximate values. Various embodiments of the invention can specifically include or exclude any of these variations or ingredients.

In some embodiments, the numbers expressing quantities of ingredients, properties such as molecular weight, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

In some embodiments, the terms "a" and "an" and "the" and similar references used in the context of describing a particular embodiment of the invention (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Preferred embodiments of this invention are described herein, including the best mode known to the inventors for carrying out the invention. Variations on those preferred embodiments will become apparent to those of ordinary skill in the art upon reading the foregoing description. It is contemplated that skilled artisans can employ such variations as appropriate, and the invention can be practiced otherwise than specifically described herein. Accordingly, many embodiments of this invention include all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents and printed publications throughout this specification. Each of the above cited references and printed publications are herein individually incorporated by reference in their entirety.

In closing, it is to be understood that the embodiments of the invention disclosed herein are illustrative of the principles of the present invention. Other modifications that can be employed can be within the scope of the invention. Thus, by way of example, but not of limitation, alternative configurations of the present invention can be utilized in accordance with the teachings herein. Accordingly, embodiments of the present invention are not limited to that precisely as shown and described.

What is claimed is:

1. A method for making a gluten-free food product, comprising:
   mixing a plurality of ingredients, wherein said plurality of ingredients comprises one or more types of cheese, one or more types of starch, one or more types of gluten-free flour, and one or more additives, wherein said one or more types of cheese comprises 20% to 40% by weight of said plurality of ingredients, said one or more types of starch comprises 20% to 40% by weight percent of said plurality of ingredients, and said one or more types of gluten-free flour comprises 1% to 10% by weight of said plurality of ingredients;
   passing a steam through said plurality of ingredients, wherein said steam melts said cheese and heats said mixture at a selected range of temperature, wherein said selected range of temperature is between 50° C. and 60° C.;
   kneading said mixture for a period of time to create a dough or a dough-like composition; and
   obtaining a gluten-free food product therefrom.

* * * * *